Figure 1:
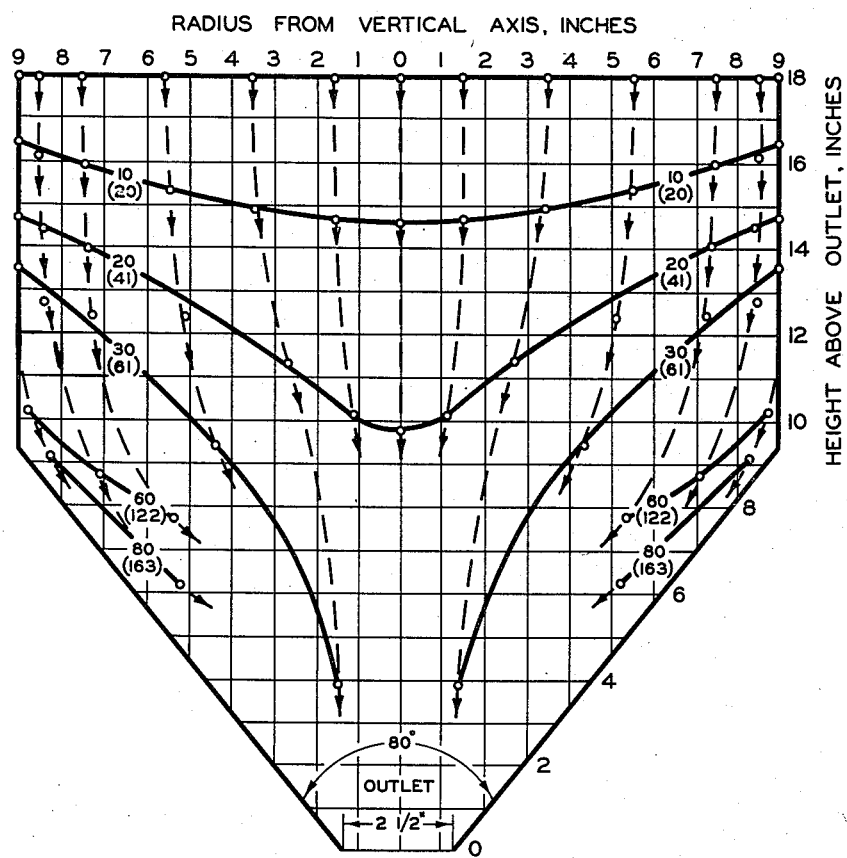

Jan. 13, 1953     L. C. BEARER     2,625,377
PEBBLE CHAMBER

Filed Dec. 28, 1948     6 Sheets-Sheet 4

INVENTOR.
L. C. BEARER

BY

ATTORNEYS

Jan. 13, 1953          L. C. BEARER                  2,625,377
                        PEBBLE CHAMBER

Filed Dec. 28, 1948                              6 Sheets-Sheet 5

INVENTOR.
L.C. BEARER

BY Hudson and Young

ATTORNEYS

Jan. 13, 1953  L. C. BEARER  2,625,377
PEBBLE CHAMBER

Filed Dec. 28, 1948  6 Sheets-Sheet 6

INVENTOR.
L. C. BEARER
BY Hudson and Young
ATTORNEYS

Patented Jan. 13, 1953

2,625,377

UNITED STATES PATENT OFFICE 2,625,377

PEBBLE CHAMBER

Louis C. Bearer, Bartlesville, Okla., assignor to Phillips Petroleum Company, a corporation of Delaware Application December 28, 1948, Serial No. 67,677

2 Claims. (Cl. 257—55)

This invention relates to pebble heat exchangers. In one of its more specific aspects, it relates to improved pebble heat exchanger chambers. In another of its more specific aspects, it relates to an improved method of operating a pebble heat exchange apparatus.

Processes which are carried out in so-called pebble heat exchange apparatus utilize a flowing mass of solid heat exchange material, which mass is passed through a first heat exchange chamber in direct heat exchange with a gaseous heat exchange material. The solid heat exchange material is passed from the first heat exchange chamber downwardly through a second heat exchange chamber in direct heat exchange with a second gaseous heat exchange material. The solid heat exchange material is introduced into the upper portion of the first or upper chamber and forms a moving bed which flows downwardly through the chamber and is either heated or cooled in a direct heat exchange with the gaseous heat exchange material which is injected into the lower portion of the first heat exchange chamber. The solid heat exchange material which has been heated or cooled in the first heat exchange chamber is gravitated into the upper portion of the second heat exchange chamber in which it forms a second moving bed which gravitates downwardly through the chamber in direct heat exchange with the second gaseous heat exchange material. The second gaseous heat exchange material is injected into the lower portion of the second heat exchange chamber and into contact with the solid heat exchange material bed therein. The direction of the heat exchange which takes place in the second heat exchange chamber is ordinarily opposite that of the heat exchange in the first heat exchange chamber.

Conventional pebble heat exchange chambers are generally formed as cylinders and the solid heat exchange material ordinarily forms a cylindrical bed within such chambers. The gaseous heat exchange material may be injected into the flowing bed of solid heat exchange material from points at its periphery and in the lower portion of the heat exchange chambers. The solid heat exchange material is generally gravitated from a substantially central point in the bottom of the chamber. Such a withdrawal is made under such conditions that certain problems arise which are not easily overcome. One disadvantage of such conventional pebble chambers in which a relatively shallow pebble bed is maintained and which has a single pebble outlet in its lower end is that it is most difficult to establish uniform flow of uniformly heated solid heat exchange material through the heat exchange chambers. In conventional chambers in which the withdrawal of solid heat exchange material is made from a substantially central point in the bottom of the heat exchange chamber in which the solid heat exchange material bed is maintained at less than one and one-half chamber diameters in depth, the center of the solid heat exchange material bed tends to drop out faster than the periphery at all levels in the pebble bed. It should be noted that in such cases where the velocity of solid material flow through the center portion of the chamber is substantially greater than the rate of flow closer to the periphery of the chamber, substantially stagnant areas of solid heat exchange material develop within the heat exchange chamber. The difficulty of obtaining uniform heat exchange is greatly aggravated thereby. This in turn creates more serious difficulties when chemical reactions are involved since temperature differences of 10° to 20° may result in up to 100 per cent difference in reaction rates. This results in poor efficiency, non-uniform products, and frequently is the cause of coking which is severe enough to stop the whole operation. The moving bed of solid heat exchange material tends to form a cone having its vertex angle at the pebble outlet in the central portion of the heat exchange chamber which vertex angle is often called the angle of slip. In order to eliminate the stagnant areas of solid heat exchange material, it has heretofore been suggested that pebble heat exchange chambers should be provided with conical bottoms, the cone of which would have a vertex angle equal to the angle of slip. It was generally believed that a chamber having a conical bottom with a vertex angle of between 38° and 45° would give the best flow for solid heat exchange material beds within a heat exchange chamber. I have found that such an assumption, when applied to heat exchange chambers in which the inner surface of the bottom cone of such chambers is smooth, does not provide an optimum of flow characteristics.

Solid heat exchange material which is conventionally used in pebble heat exchange apparatus is generally called "pebbles." The term "pebbles" as used herein denotes any solid refractory material of flowable size and form which has sufficient mechanical strength to carry large amounts of heat from one heat exchange chamber to another without rapid deterioration or substantial breakage. Pebbles which are conventionally used in pebble heater apparatus are substantially spherical and range from about one-eighth inch to about one inch in diameter. The pebbles most adaptable to pebble heater apparatus are formed of metal alloys, ceramics, or other material having the properties above described. Silicon carbide, aluminum, periclase, beryllia, Stellite, zirconia, and mullite may be satisfactorily used to form pebbles for use in high temperature operation. Such materials may be used, either singly or in admixture with each other, or with other materials. Pebbles formed of such material, when properly fired, serve very well in high temperature operation, some withstanding temperatures up to about 4000° F. Pebbles which are used may be either inert or catalytic when used in any selected process. Pebbles which may be satisfactorily used for processes in which severe cooling is utilized may be formed of such material as alumina, aluminum, nickel, cobalt, copper, iron, magnesia, and zirconia. Pebbles formed of such material serve very well in pebble coolers, but preference is given to pebbles composed of nickel-steel and nickel-copper alloys. Pebbles which are used within such pebble heater apparatus must be capable of withstanding temperature changes within the apparatus. In processes carried on at extreme temperature limits, such as 2700° F. and —300° F., pebbles having diameters between one-eighth and three-eighths inch are preferred.

An object of this invention is to provide an improved pebble heat exchange chamber. Another object of the invention is to provide a pebble heat exchange chamber for obtaining the greatest volume per cent of uniform pebble flow therethrough. Another object of the invention is to provide a pebble heat exchange chamber which has a height to diameter ratio of at least 1:1 for obtaining the greatest volume per cent of uniform pebble flow therethrough. Another object of the invention is to provide an improved smooth conical bottomed pebble heat exchange chamber. Other and further objects and advantages will be apparent upon study of the accompanying disclosure.

Figure 2:
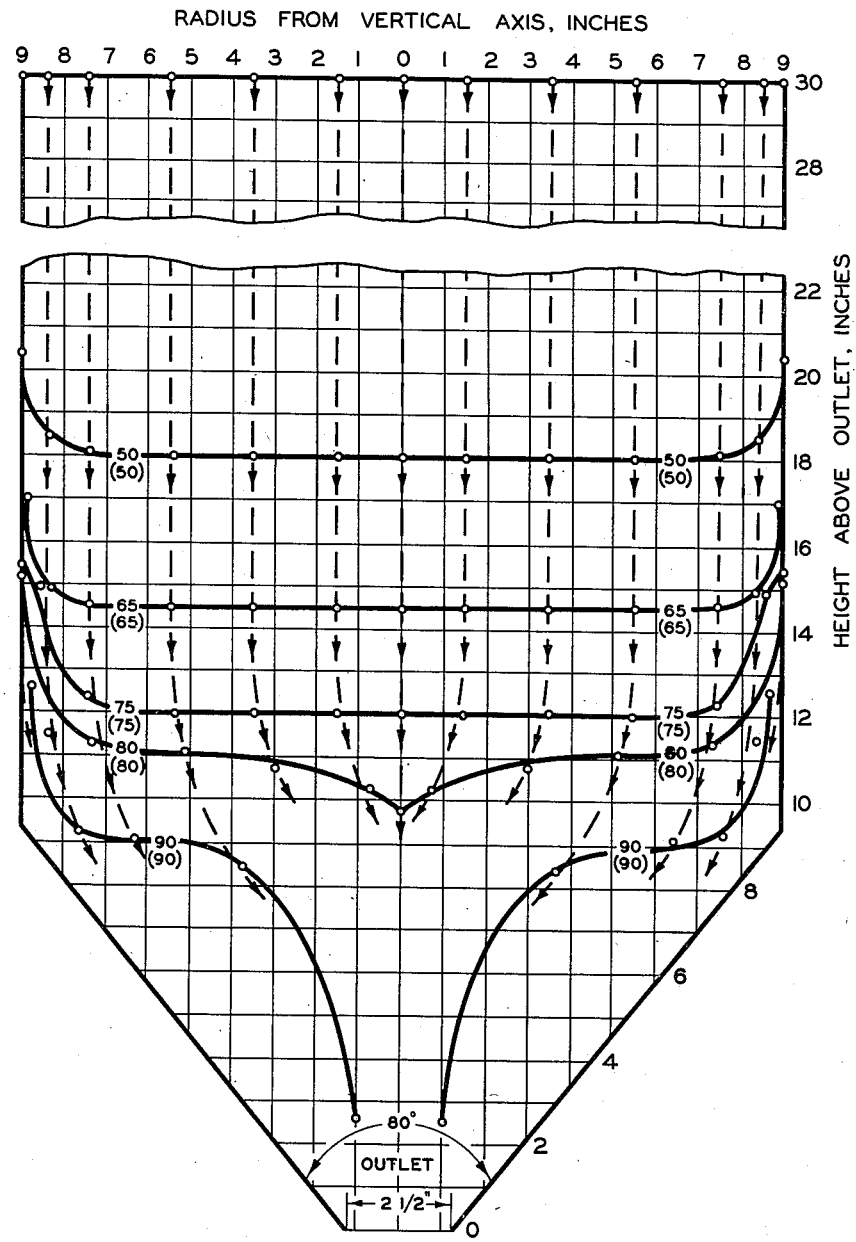
Figure 3:
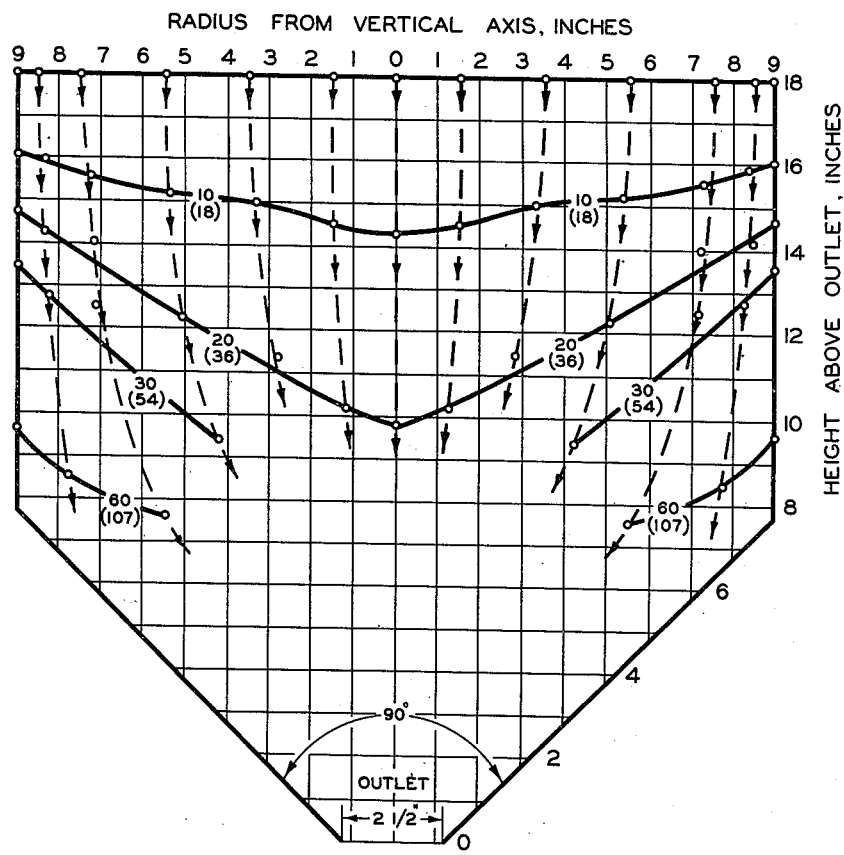
Figure 4:
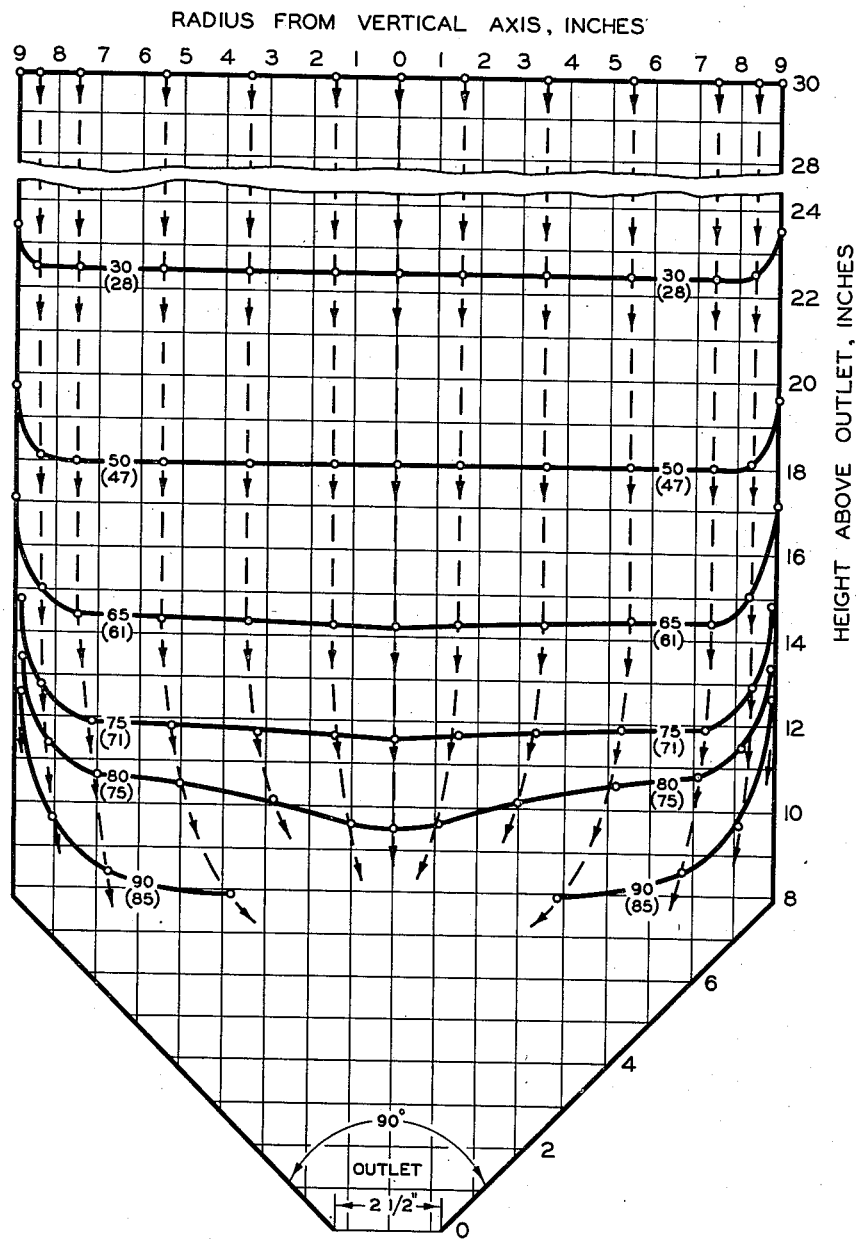
Figures 5, 7:
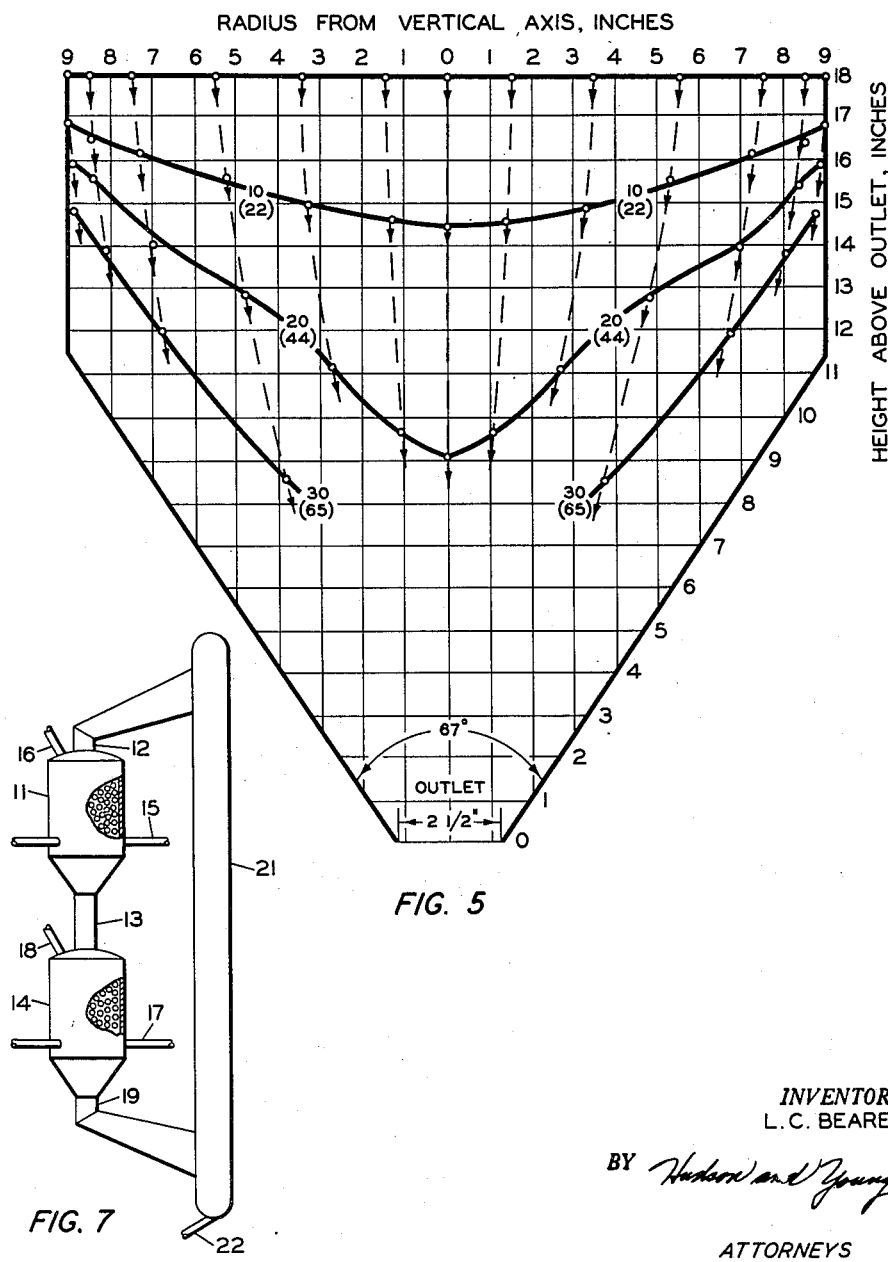
Figure 6:
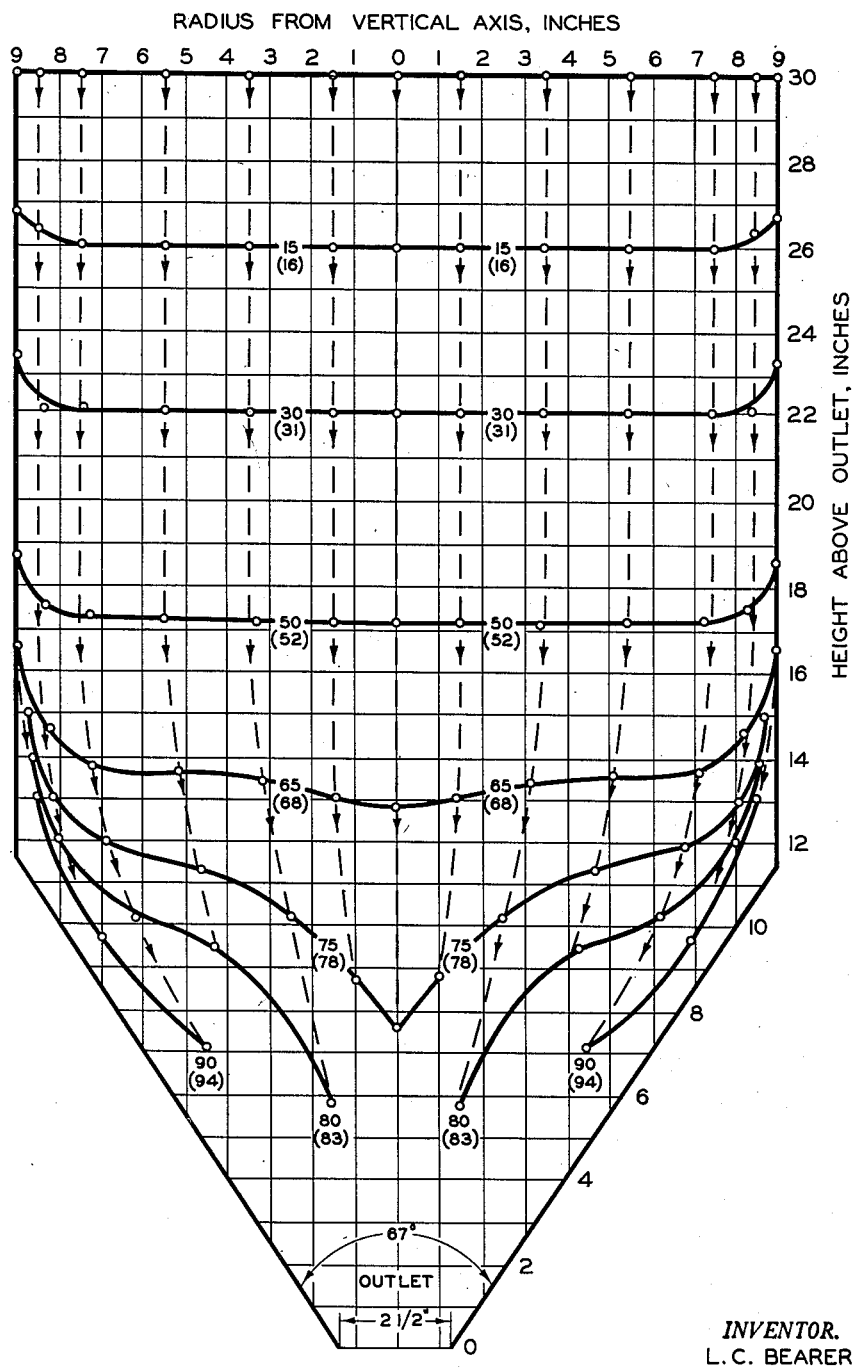

Understanding of the invention will be facilitated upon reference to the diagrammatic drawings in which Figure 1 is a graphical representation of pebble flow patterns in a pebble heat exchanger having a smooth surfaced conical bottom, the vertex angle of which cone is 80° and the height to diameter ratio being 1:1. Figure 2 is a second graphical representation of pebble flow patterns in a pebble heat exchange chamber having a smooth surfaced conical bottom in which the vertex angle is 80° and in which the height to diameter ratio is approximately 1.7:1. Figure 3 is a graphical representation of pebble flow patterns in a pebble heat exchange chamber having a smooth surfaced conical bottom, the vertex angle of which is 90° and the height to diameter ratio of the chamber being 1:1. Figure 4 is a graphical representation of the pebble flow pattern in a pebble heat exchange chamber having a smooth surfaced conical bottom, the vertex angle of which is 90° and the height to diameter ratio of the chamber being about 1.7:1. Figure 5 is a graphical representation of pebble flow patterns in a pebble heat exchange chamber having a smooth surfaced conical bottom, the vertex angle of which cone is 67° and the height to diameter ratio of the chamber being 1:1. Figure 6 is a graphical representation of pebble flow patterns in a pebble heat exchange chamber having a smooth surfaced conical bottom with a vertex angle of 67° and the chamber having a height to diameter ratio of about 1.7:1. Figure 7 is a schematic view of a pebble heat exchanger apparatus of this invention.

I have found that pebble stagnation can be substantially eliminated from pebble heat exchange chambers by the utilization of chambers having smooth surfaced conical bottoms, the vertex of the cones being 80°. In chambers utilizing such a bottom closure, or closures having vertex angles varying not more than 5° from the 80° angle referred to above, the greatest volume per cent of uniform pebble flow is obtained.

The graphical representation of Figures 1 and 2 discloses the excellent flow patterns which are obtained in pebble heat exchange chambers having smooth surfaced conical bottoms with vertex angles of 80°. Colored pebbles were placed at spaced intervals over the upper surface of pebble beds in chambers, the proportions of which are shown in the graphs of Figures 1 and 2. The pebbles of the pebble bed were gravitated through the chamber and were removed through a two and one-half inch pebble outlet in the vertex of the conical bottom of the chamber. As given amounts of pebbles were removed from the bottom of each chamber, equal amounts of pebbles were added to the top of the chamber so as to maintain an equal pressure on the pebbles within the chambers. After given volumes of pebbles had been removed from the chambers, flow therethrough was stopped and pebbles which had been added to the top of the pebble bed were removed so as to determine the position of the colored pebbles after the withdrawal of the given pebble volumes from the chambers. Incremental volumes (liters) of pebbles which were removed before each measurement are indicated by the figure interposed in the isochores connecting the colored pebbles at the time of each measurement. The chamber of Figure 1 had a total volume of 49 liters of pebbles. The ratio of the pebble volume removed to the total chamber volume (per cent) is shown in parenthesis. After the removal of 30 liters of pebbles from the chamber, it was determined that the pebbles which had originally been placed on or within a one and one-half inch radius from the chamber axis had been removed from the chamber. Initial flow through the upper portion of the chamber graphically shown as Figure 1 was substantially uniform despite the fact that the pebble bed was shallow. The pebble depth which has heretofore been considered to be necessary for obtaining a semblance of uniform pebble flow corresponds to a height to depth ratio of about 1.5 to 1. The uniformity of flow was carried to even a greater degree in the chamber graphically disclosed as Figure 2 in which the height to diameter ratio was about 1.7:1. The total pebble volume of the chamber shown as Figure 2 was 100 liters. In the deeper chamber, the pebbles within a one and one-half inch radius from the axis of the chamber had not been removed until between 80 and 90 liters of pebbles had gravitated through the pebble outlet in the bottom of the chamber. In a comparison between the pebble flow exhibited within the chamber graphically disclosed as Figure 1 and that shown as Figure 2, it will be noted that a slight tendency exists for the pebbles to become semi-stagnant in the chamber of Figure 1, but the tendency to stagnate appears to have been almost completely removed in the chamber of Figure 2.

This trend is always exhibited when the depth of the bed is increased significantly. Broadly speaking, therefore, an unobstructed chamber utilizing a smooth bottomed closure, the walls of which closure form a vertex angle of 80° plus or minus 5°, obtains substantially uniform flow through at least a portion of the pebble bed even when the height to width ratio is as low as 1:1.

In contrast to the pebble flow patterns which were obtained in the chambers shown as Figures 1 and 2, chambers having a conical bottom with a vertex angle of 90° obtained pebble flow patterns which were far less desirable. Colored pebbles were placed on pebble beds contained within the chambers shown as Figures 3 and 4 similarly to the placement described with relation to the pebble beds in the chambers of Figures 1 and 2 of the drawing. Referring specifically to Figure 3 of the drawing, it will be noted that after the removal of 30 liters of pebbles from the chamber, which chamber had a pebble volume of 56 liters, the pebbles originally placed on a three and one-half inch radius from the axis of the chamber had been removed from the chamber. It will thus be noted that in the chamber which had a height to width ratio of 1:1 and which utilized a conical bottom having a vertex angle of 90°, a substantially greater portion of the pebbles in the central portion of the chamber had dropped out of the bed due to non-uniform flow than dropped out in chambers which utilized a vertex angle of 80°. Similar results were obtained in the use of the chamber which had a height to diameter ratio of about 1.7:1 and utilized a smooth surfaced conical bottom having a vertex angle of 90°. That chamber had a total pebble volume of 106 liters. After 90 liters of pebbles had been removed therefrom, it was determined that those pebbles which had started as far as three and one-half inches from the axis of the chamber had gravitated through the pebble outlet in the vertex of the bottom closure due to the non-uniform pebble flow within the chamber. The tendency for a small portion of the pebbles to become stagnant, as shown in Figure 3, was again overcome by the deeper pebble bed in the chamber, as shown in Figure 4.

Figures 5 and 6 of the drawing graphically show pebble chambers utilizing a conical bottom and having a vertex angle of 67°. It should be noted that the angle of 67° is closer to the angle of 38 to 45° which had heretofore been considered to be the angle which would give the most uniform flow. Colored pebbles were once again placed at spaced intervals over the top of the pebble beds within the chambers graphically disclosed as Figures 5 and 6 of the drawing, and as pebbles were gravitated from the chambers through the pebble outlets at the vertex of the conical bottoms, additional pebbles were added to the top of the pebble beds so as to maintain a uniformity of pebble pressure within the chambers. The chamber shown as Figure 5 of the drawing had a total pebble volume of 46 pebble liters. After the withdrawal of 30 liters of pebbles from the lower portion of the chamber, it was determined that pebbles originally as far as three and one-half inches from the axis of the chamber had gravitated through the pebble outlet in the bottom of the chamber. This result was the same as that obtained when using a pebble chamber having a conical bottom with a vertex angle of 90°. Thus, desirability of the 80° vertex angle becomes apparent immediately upon a comparison of Figures 3 and 5 with Figure 1. The chamber which is graphically shown as Figure 6 of the drawing had a total pebble volume of 96 liters. After a total of 90 liters of the original pebble volume had been withdrawn, it was determined that pebbles as far as five and one-half inches from the axis of the chamber had gravitated through the pebble outlet at the vertex of the conical chamber bottom. Once again the desirability of the 80° vertex angle in the pebble chamber bottom becomes apparent upon comparison of Figures 2, 4 and 6 of the drawings. Although the advantages of the 80° angled bottom chamber do not show up as extremely great in the once through flow of pebbles shown in the drawings the advantages are increased many fold when the chamber operation is continuous.

The optimum value of the 80° angle plus or minus 5° is dependent upon the utilization of a smooth surfaced chamber bottom. Such a smooth surface may be obtained by the utilization of a metal or of refractory materials having glazed surfaces. Metal alloys can easily be utilized in pebble heat exchange chambers at temperatures varying between 1500° F. and −300° F. Glazed refractories may be utilized in processes which are carried on at temperatures above 1500° F. Surfaces which are fairly satisfactory in smoothness and which can be used at temperatures even higher than permissible with glazed refractories, can be prepared by careful designing and constructing with unglazed high-temperature refractories.

Referring to the schematic portrayal of the pebble heater apparatus of Figure 7 of the drawing, pebbles are passed into the upper portion of pebble heat exchange chamber 11 through pebble inlet conduit 12 and gravitate downwardly therethrough as a flowing pebble mass and pass through pebble communication conduit 13 into the upper portion of the second pebble heat exchange chamber 14. A first pebble heat exchange fluid is injected into the lower portion of the pebble bed in chamber 11 through fluid heat exchange material inlet conduits 15 in the lower portion of chamber 11. The fluid material flows upwardly through the downwardly flowing pebble mass in direct heat exchange relation therewith and is removed from the upper portion of chamber 11 through effluent outlet conduit 16. A second fluid heat exchange material is injected into the flowing pebble mass within chamber 14 through fluid heat exchange material inlet conduits 17 in the lower portion of chamber 14. The fluid material flows upwardly through the flowing pebble mass in direct heat exchange relation therewith and is removed from the upper portion of chamber 14 through effluent outlet conduit 18. The pebbles are gravitated from the lower portion of chamber 14 through pebble outlet conduit 19 and are elevated to the upper portion of chamber 11 by means of elevator 21. The pebble heat exchange chamber of this invention may be utilized in pebble heat exchanger apparatus for the purpose of heating or thermally treating or converting fluid materials, or may be utilized in pebble heat exchanger apparatus which is used for the purpose of refrigerating fluid materials so as to obtain a separation of the fluid constituents. When the apparatus is utilized as a pebble cooler, materials which are precipitated within chamber 14 may be removed from the lower portion of chamber 14 with the pebbles and the pebbles and precipitated materials may be separated in elevator 21. The precipitated materials will then be removed from the lower portion of elevator 21 through precipitated material outlet conduit 22.

Other and further modifications will be apparent to those skilled in the art upon study of the accompanying disclosure. These modifications are believed to be within the scope of this invention and the spirit and the scope of this disclosure.

I claim:

1. An improved pebble heat exchange chamber comprising in combination an upright closed cylindrical shell, being unobstructed throughout its length and having top and bottom closures, said bottom closure extending downwardly and inwardly as a cone from the upright walls of said shell to form a vertex angle of between 75° and 85° and having a smooth inner surface, said chamber having a height to width ratio of at least 1:1; a centrally disposed pebble inlet in said top closure; gaseous effluent outlet means in the upper portion of said chamber; a pebble outlet in the vertex of said bottom closure; and heat exchange fluid inlet means in the lower portion of said chamber.

2. The pebble heat exchange chamber of claim 1, wherein said bottom closure has a vertex angle of 80°.

LOUIS C. BEARER.

REFERENCES CITED

The following references are of record in the file of this patent:

UNITED STATES PATENTS

| Number | Name | Date |
|---|---|---|
| 1,102,714 | Bornmann | July 7, 1914 |
| 1,148,331 | Olsson | July 27, 1915 |
| 1,614,387 | Pereda | Jan. 11, 1927 |
| 2,399,450 | Ramseyer | Apr. 30, 1946 |
| 2,416,230 | Simpson | Feb. 18, 1947 |
| 2,430,669 | Crowley, Jr. | Nov. 11, 1947 |
| 2,443,337 | Weber | June 15, 1948 |
| 2,518,304 | Goins et al. | Aug. 8, 1950 |